United States Patent Office 2,858,323
Patented Oct. 28, 1958

2,858,323
ADDUCTS OF LONG CHAIN UNSATURATED COMPOUNDS

Curtis W. Smith, Berkeley, Calif., assignor to Shell Development Company, New York, N. Y., a corporation of Delaware No Drawing. Application January 24, 1956
Serial No. 561,160

9 Claims. (Cl. 260—346.8)

This invention relates to novel adducts of maleic anhydride. More particularly it relates to novel adducts obtained by the reaction of maleic anhydride with certain long chain dibasic acids, diesters, diketones or diamides.

As the field of epoxy resins prepared from glycidyl ethers enlarges, there is a continuing need for the development of better curing agents for these versatile resins. The requirements for improved curing agents have resulted in the development of many such curing agents and these curing agents have varied widely depending on the particular resin used, its application in surface coatings, in castings, and the like.

It is an object of this invention to provide a novel class of curing agents for polyglycidyl ethers. It is another object of this invention to provide low cost curing agents for such resins that are easy and simple to manufacture. It is yet another object of this invention to provide a novel class of curing agents that may be used for both coating or casting resin compositions and thereby simplifying the curing process for fabricators of polyglycidyl ether resin products. Still other objects of this invention will appear as the description proceeds.

It has now been found that these and other objects may be accomplished by novel adducts which are produced by the reaction of maleic anhydride with a compound having the formula

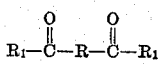

wherein R is a divalent chain having from 14 to 26 carbon atoms, said divalent chain having two unsaturated linkages which are at least four carbon atoms removed from the carbonyl groups, $R_1$ is a functional group selected from alkyl, aryl, aralkyl, —OH, —$NH_2$ and $OR_2$, $R_2$ being alkyl, aryl or aralkyl.

It is seen then that the products of this invention are those that may be obtained by the reaction of maleic anhydride with dicarboxylic acids, ester, ketones or amides having at least 16 carbon atoms between the —$COR_1$ groups and having at least two ethylenic groups which are non-conjugated and that are at least four carbon atoms removed from the terminal —$COR_1$ groups. $R_1$ may be either branch or straight chain but in any case it will contain a minimum of 10 carbon atoms between the carbonyl groups.

The unsaturated diacids and diesters employed in the preparation of these novel products are described in copending application Serial No. 432,026, filed May 24, 1954, and the diamides which may be used are described in copending application Serial No. 486,033, filed February 3, 1955. The diketones and the processes for preparing the same are described in U. S. Patent 2,671,810.

Although the acids, esters and amides are fully described in the above mentioned copending applications, it is desirable to briefly outline their nature.

Essentially, the amides may be prepared from their corresponding acids. The acids and esters may be obtained by treating (a) a cyclic peroxide of the formula

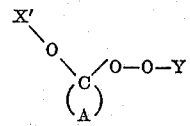

wherein A is a divalent radical having a divalent chain of 3 to 9 carbon atoms, X' is a radical of the group consisting of hydrogen, hydroxyl and hydrocarbon radicals of not more than 12 carbon atoms and Y is a hydrogen atom or a

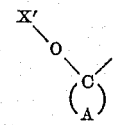

radical with (b) a conjugated diethyl compound of 4 to 18 carbon atoms and in the presence of (c) a redox catalyst.

The essential feature of these cyclic peroxides is that they contain 4 to 10 carbon atoms in a primary ring having a hydroxyl or methoxy group directly attached to the same cyclic carbon atom as the peroxygen linkage.

Cyclic peroxides especially useful for producing the unsaturated esters and acids are those obtainable by reacting together hydrogen peroxide and a cyclic ketone of the formula

wherein the symbol A is a divalent radical of the type previously indicated. The peroxide thus obtained is mainly a dihydroxy peroxide and the ultimate product is a diacid. If the reaction is conducted additionally in the presence of an alcohol such as methanol, the ultimate product is mainly a diester although there will be quantities of the diacid present. These peroxides can be produced as described in Milas Patent U. S. 2,298,405, the products from equimolar amounts of cyclic ketone and hydrogen peroxide being, as pointed out by Criegee, Ann., vol. 565, page 7 (1949), and by Cooper and Davison, J. Chem. Soc., page 1180 (1952), chiefly the 1-hydroxy-1'-hydroperoxydicycloalkanyl peroxides

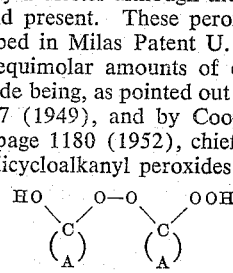

Preferred cyclic peroxides for use in the process are the 1,1'-hydrodicycloalkanyl peroxides

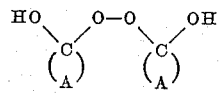

obtainable by the use of two moles of cyclic ketone per mole of hydrogen peroxide in an excess of methanol. Other cyclic peroxides which can be alternatively used in the reaction are, for example, the 1,1-dihydroperoxy-dicycloalkanyl peroxides

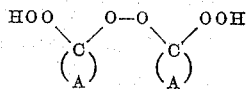

and the 1-hydroxycycloalkanyl hydroperoxides

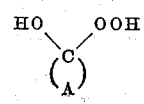

As conjugated diethylenic compounds which can be reacted with the foregoing cyclic compounds are included conjugated diolefins such as 1,3-butadiene, 1,3-pentadiene, isoprene, dimethyl - 1,3 - butadiene, 1,3,5 - hexatriene, 2 - ethyl - 1,3 - pentadiene, 2,4 - octadiene, 1,1 - dimethyl-3 - tertiary butyl - 1,3 - butadiene, chloroprene, 2,3 - dichloro - 1,3 - butadiene, 1 - chloro - 2 - methyl- and 1,3-butadiene.

From the acids thus prepared the corresponding diamides may be prepared as described in copending application Serial No. 486,033, filed February 3, 1955.

The acids may be either straight chain or branch chain or mixtures thereof. Among such acids are 8,12-eicosadiene - 1,20 - dioic acid, 8,10 - dimethyl - 8 - vinyl-10-octadecene-1,18-dioic acid, 8,11-dimethyl-8-vinyl-10-octadecene-1,18-dioic acid, 10-methyl-8-isopropenyl-10-octadecene-1,18-dioic acid, 11-methyl-8-isopropenyl-10-octadecene-1,18-dioic acid, 4,15-dimethyl-8-vinyl-10-octadecene-1,18-dioic acid, 3,4-, 3,16-, 3,17-, 4,6-, 4,17- and 4,18-dimethyl-8,12-eicosadiene-1,20-dioic acid.

Among the esters that may be used are dimethyl-8-vinyl-10-octadecene-18-dioate, dimethyl-8,12-eicosadiene-1,20-dioate, the 8,13- and the 9,12-dimethyl derivatives thereof, dimethyl 7,11-octadecadiene-1,18-dioate, dimethyl-7-vinyl-9-hexadecene-1,16-dioate. Also the dimethyl ester of dichloro-7,11-octadecene-1,18-dioic acid, dimethyl - 4,17 - dimethyl - 8,12 - eicosadiene - 1,20-dioic acid, and 4,15-dimethyl-8-vinyl-10-octadecene-1,18-dioic acid. Dimethyl esters of tetramethyl-8,12-eicosadiene-1,20-dioic acids having the four methyl groups in the 3- or 4-, 8- or 9-, 12- or 13-, and 17- or 18- positions, respectively, and the like.

Among the diamides are 8,12-eicosadiene-1,20-diamide, 8,12 - diisopropyl - 8,12 - eicosadiene - 1,20-diamide, 3,16-dichloro-8,12-eicosadiene-1,2-diamide, N-butyl-N-octyl 8,12-eicosadiene-1,20-diamide, N,N'-diallyl 8,16 - dichloro - 8,12 - eicosadiene - 1,20 - diamide, octadecadiene - 1,18 - diamide, N,N' - diisopropyl 4,15-dimethyl - 8 - vinyl - 10 - octadecene - 1,18 - diamide, N,N' - diallyl 10,14 - tetracosadiene - 1,24 - diamide, N,N'-(4-aminobutyl) 8,12 - eicosadiene - 1,20 - diamide, N,N' - di(5 - aminohexyl) 8,12 - eicosadiene - 1,20-diamide, N,N' - di(8 - aminooctyl) 3,3,4,4 - tetramethyl-8,12 - eicosadiene - 1,18 - diamide, N,N,N'N' - tetraethyl 8,12 - eicosadiene - 1,20 - diamide, N,N' - di(2 - ethylphenyl) 8,12-eicosadiene-1,20-diamide, N,N'-di(furfuryl) 7,11 - octadecadiene - 1,18 - diamide, N,N' - di(4-aminophenyl) 7,11-octadecadiene-1,18-diamide, N,N'-di(4 - aminonaphthyl) 7,11 - octadecadiene - 1,18 - diamide N,N'-dioctadecyl and 8,12-eicosadiene-1,20-diamide.

Among the diketones that may be used are 9,13-docosadiene-2,21-dione, 9,13-docosadiene-2,21-dione, 1,22-diphenyl-9,13-docosadiene-2,21-dione, and the like.

The diacids, diesters and diamides may be used in mixtures and under certain circumstances it is preferred as an economy step. Thus for example, in the above mentioned copending application Serial No. 432,026, the processes there described often produce mixtures of acids and esters which are further mixtures of branched and straight chain products, and rather than separate them, they may be used in admixture without adverse effect.

While the configuration of the adducts of this invention are not known for certain and will vary widely depending on the starting materials, a typical linear monoadduct is produced, for example, as follows:

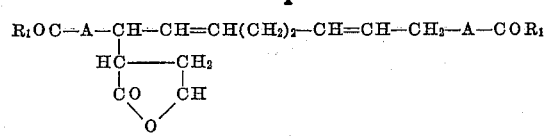

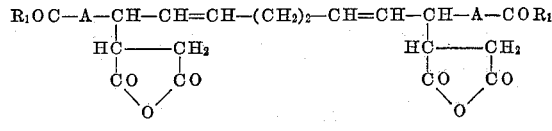

I

The diadduct probably is

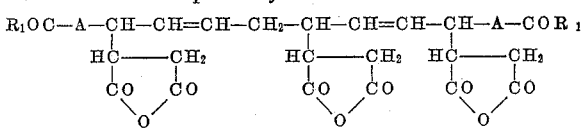

II and the triadduct probably is

R₁OC—A—CH—CH=CH—CH₂—CH—CH=CH—CH—A—COR₁

III

In these formulae $R_1$ is the same as previously indicated and A is a divalent radical having a chain of 4 to 9 carbon atoms. It should be understood that the claims are not limited by any theoretical considerations or any particular structural formula. The following examples will illustrate rather than limit the embodiments of this invention as recited in the claims. All proportions are in parts by weight unless otherwise indicated.

EXAMPLE I 183 parts (0.5 mole) of dimethyl ester of 8,12-eicosene-1,20-dioate, having the formula

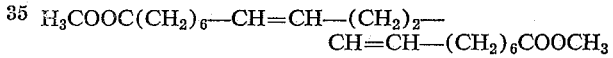

and 59 parts (0.60 mole) of maleic anhydride are heated at 200° C. for about 7 hours while maintaining the reaction mass under an atmosphere of carbon dioxide. The reaction mixture is then dissolved in 450 parts of chloroform and then washed three times with 10% aqueous $Na_2SO_4$; 4 parts of unreacted maleic anhydride is recovered indicating that each mole of the ester "fixes" 1.2 moles of maleic anhydride. The chloroform solution is dried over anhydrous sodium sulfate, filtered and then stripped. The product, 290 parts, is a viscous, clear, light amber liquid having the following analysis:

| | Found | Calculated for ($C_{26}H_{90}O_7$) |
|---|---|---|
| Anhydride Value, moles/100 g | 0.13 | .22 |
| Total acidity, electrometric eq./100 g | .332 | .43 |
| Total Sap. No., eq./100 g., Not corrected for acidity | .88 | .86 |
| Iodine No., g./100 g. Woburn | 79 | 109 |

The product has the probable configuration of Formula I above where $R_1$ is —$OCH_3$ and the A's are —$C_5H_{10}$.

EXAMPLE II

The procedure of Example I is repeated except that 118 parts (1.2 moles) of maleic anhydride is used. 16.7 parts of unreacted anhydride is removed indicating that one mole of the ester binds 2.1 moles of the anhydride. The yield is 282 parts of the corresponding di-adduct of Formula II above and has the following analysis:

| | Found | Calculated for $C_{30}H_{42}O_{10}$ |
|---|---|---|
| Anhydride Value, moles/100 g | .057 | .355 |
| Total Acidity eq./100 g | .60 | .71 |
| Total Sap. No., eq./100 g., Not corrected for acidity | 1.0 | 1.07 |
| Iodine No., g./100 g. Woburn | 57.0 | 90.2 |

EXAMPLE III

The procedure of Example I is followed except that 216 parts (2.2 moles) of maleic anhydride is initially charged into the reactor. 77 parts of unreacted maleic anhydride is recovered indicating that the corresponding triadduct of Formula III is formed. The yield is 325 parts of a clear brown viscous liquid having the following analysis:

|  | Found | Calculated for $C_{39}H_{44}O_{13}$ |
|---|---|---|
| Anhydride Value, moles/100 g | .10 | .45 |
| Total Acidity eq./100 g | .70 | .91 |
| Total Sap. No., eq./100 g., Not corrected for acidity | 1.3 | 1.2 |
| Iodine No., g./100 g. Woburn | 39.0 | 76.8 |

EXAMPLE IV

The procedure of Example I is repeated except that 155 parts of 8,12-eicosadiene-1,20-dioic acid replaces the dimethyl ester. The product corresponds to that of Formula I above with $R_1$ being —OH and the A's being —$C_5H_{10}$. By varying the quantity of the maleic anhydride used the product may be varied between the mono-, di-, or tri-adducts. Products which are similar in structure, i. e., where $R_1$ is a lower alkyl, are obtained when the diketones of U. S. Patent 2,671,610 replaces the ester.

EXAMPLE V

As in the above examples, 170 parts of the corresponding amide is reacted with 59 parts, 118 parts and 216 parts, respectively, of maleic anhydride. The mono-, di- and tri-adduct of 8,12-eicosene-1,20-diamide is produced.

EXAMPLE VI

As in the above examples, 167 parts of 9,13-docosadiene-2,21-dione is reacted with 59, 118 and 216 parts of maleic anhydride to form the mono-, di-, and tri-adducts, respectively, of the corresponding diketone.

EXAMPLE VII

The procedures of Examples I, II and III are repeated except that 8,10-dimethyl-8-vinyl-10-octadecene-1,18-dioic acid replaces the eicosene-dioate. The corresponding mono-, di- and tri-adducts of the acid are obtained.

EXAMPLE VIII

The procedure of Example IV is repeated except that hexadecadiene-6,10-dioic acid replaces the eicosadiene dioic acid to form the corresponding mono-, di- and tri-adducts.

EXAMPLE IX

The procedure of Example VIII is repeated except that the corresponding methyl-ester replaces the acid to produce the ester adducts.

The above examples illustrate that this invention is not limited to the particular embodiments shown as the adducts readily form with the acids, esters, ketones and amides having from 16 to 28 carbon atoms as previously described. Furthermore, this invention is not limited, in the case of diesters, to methyl esters. If desired, other diesters may be prepared from the methyl esters by ester interchange, or alcoholysis, i. e., the reaction of the methyl ester with an alcohol in the presence of suitable catalysts. The use of other esters generally is not preferred for the curing agents that are described below since there is no advantage resulting from such a substitution of esters, but rather it has the effect of increasing the cost without a proportional improvement in the product. Thus, such lower ester-adducts as the ethyl, propyl and butyl adducts are included within the scope of this invention, although not limited thereto as it is well known that the process of ester interchange is not limited to lower alcohols but may also extend to higher alcohols as myristyl alcohol, stearic alcohol, and the like and also to aromatic alcohols.

The polyfunctional adducts of this invention can be further reacted with other polyfunctional compounds, as polyhydric alcohols, to form higher molecular weight adducts.

Generally, the adduct is formed in solutions of organic solvents which are immiscible with water such as chloroform, benzene, carbon tetrachloride, and the like. Such a reaction medium is designed to permit the removal of excess anhydride by washing with water. When all the excess anhydride is removed, as indicated by simple titration, the solvent is stripped to produce the final product. With adequate washing, recrystallization is generally not required. In order to obtain maximum yields of relatively pure products it is preferred that the anhydride be present in slight excesses of the mole ratio required to produce the mono-, di-, or tri-adducts of the acids, esters, ketones or amides, as the case may be. The specific quantities required will vary in each instance depending on the particular product desired but in all cases the use of slight excesses over the calculated amount needed to produce the mono-, di-, or tri-adduct in quantitative yield is preferred. When the quantity is substantially between that required to produce the mono- and the di-adduct on the one hand and the di- and tri-adduct on the other hand, mixtures of the two are obtained. As previously indicated, separation of the mixture is often unnecessary as it may be used for the purposes hereinafter indicated without any adverse effect. In general, mole ratios will range from about 1:1 to about 3:1 of the anhydride to the acid, ester, ketone or amide, there being no preferred range as this will depend on the desired final product.

It has been found that more than 3 moles of the anhydride apparently does not add easily to the acid, ester, ketone or amide under the usual conditions of temperature and pressure.

The temperature range under which the adducts are preferably formed is about 150–200° C., although lower temperatures may be used, e. g., in the order of 100° C. At lower temperatures considerably greater time is required to complete the reaction whereas higher temperatures, e. g., in the order of 250° C., cause degradation. In order to operate at preferred temperatures and yet reduce oxidation losses to a minimum it is desirable that the reaction be conducted in an atmosphere of an inert gas such as carbon dioxide or nitrogen.

As previously indicated the products of this invention are of unusual value as improved curing agents for polyglycidyl ethers. Not only do they increase the hardness and flexibility of such resins without requiring an increase in curing time but the di- and tri-adducts impart improved resistance to solubility. Such resins containing the adducts of this invention are further characterized as being highly resistant to the adsorption of water, thus making them highly useful in many applications where water resistance is of importance. Because cast resins prepared with these new adducts are extremely hard they may be used for, among other things, stamping sheet metal and in the repairs of automobile bodies. Their resistance to breakage, shattering and solvents makes them highly useful in the packaging, storing and shipping of all kinds of liquids particularly chemicals.

Table I shows typical tests on the adducts of the dimethyl esters of 8,12-eicosadiene-1,20-dioate.

Table I

[Film sample: EPON 1001.[1] Cure cycle: 30 min. at 150° C.]

| Adduct | Amount 1001 (PHR) | Condition When Hot | Knife Test | 15 Min. at Room Temperature | | 15 Min. Boiling Water | Color |
|---|---|---|---|---|---|---|---|
| | | | | Toluene | Methyl Isobutyl Ketone | | |
| Mono- | 84 | Soft | Flexible | Softened | Softened | Unaffected | Dark Amber. |
| Mono- | 94 | ----do---- | ----do---- | ----do---- | ----do---- | ----do---- | Do. |
| Mono- | 104 | ----do---- | ----do---- | ----do---- | ----do---- | ----do---- | Do. |
| Di- | 49 | ----do---- | ----do---- | Unaffected | Unaffected | ----do---- | Do. |
| Di- | 59 | ----do---- | ----do---- | ----do---- | ----do---- | ----do---- | Do. |
| Di- | 69 | Slightly Soft. | ----do---- | ----do---- | ----do---- | ----do---- | Do. |
| Tri- | 34 | Hard | ----do---- | ----do---- | ----do---- | ----do---- | Do. |
| Tri- | 44 | ----do---- | ----do---- | ----do---- | ----do---- | ----do---- | Do. |
| Tri- | 54 | ----do---- | ----do---- | ----do---- | ----do---- | ----do---- | Do. |

[1] Epoxy resin—product of Shell Chemical Corporation.

When similar tests are performed on acid adducts comparable results are obtained and in some instances they are better as they tend to be harder when hot and do not soften as readily in toluene and methyl isobutylketone. In general, it will be found that the acid and ester-adduct are most preferred while the ketone and amide-adducts are the least preferred.

Table II shows typical tests on the same adducts used in cast resins.

satisfactory as will be exhibited by less satisfactory solubility characteristics, water swelling, brittleness, softness and the like.

The resins may be cured by conventional methods, e. g., by baking or by the application of heated forced air. Generally, it is adequate to cure the film compositions at 150° C. for about 30 minutes whereas the cast compositions will require about 125° C. for about 4 hours. It is preferred that these resins be cured at temperatures

Table II

[Casting sample: EPON 828.[1] Cure cycle: 4 hours at 125° C.]

| Adduct | Amount 828 (PHR) | Barcol Hardness | | | | | 3 Hr. Boiling Water | | 3 Hr. Boiling Acetone | | Color |
|---|---|---|---|---|---|---|---|---|---|---|---|
| | | R. T. | 60° | 80° | 100° | 120° | Barcol | Percent W. Change | Barcol | Percent W. Change | |
| Mono- | 249 | 0 | (Rubbery Like) | | | | 0 | +1.40 | 0 | Disintegrated | Dark Amber. |
| Di- | 150 | 10 | 0 | | | | 0 | +2.63 | 0 | ----do---- | Do. |
| Tri- | 118 | 28 | 0 | (Foamed) | | | 0 | 3.55 | 0 | ----do---- | Do. |

[1] Epoxy resin—product of Shell Chemical Corporation.

Results comparable to the film composition are obtained in the case of acid-, ketone- and amide-adducts, but as in that case, the acid-adducts are, in certain instances, preferred over the ester-, ketone- and amide-adducts. Such factors as the specific application to which the resin is to be put, its cost, relative ease of handling, and similar considerations will often determine whether the ester-, acid-, ketone- or amide-adduct is preferred.

In preparing polyglycidyl resins cured with the novel products of this invention, the optimum amount of the adduct is, in most cases, just sufficient to supply one anhydride ring for each glycidyl group. The exact optimum amount will vary depending on the particular resins and the particular mono-, di- or tri-adduct being used. In theory, each glycidyl group of the resin reacts with the anhydride group to produce ester groups almost exclusively without the formation of water. As the glycidyl group and the anhydride are difunctional, a highly cross-linked network results with the ester groups serving to connect these networks. Thus, in order to provide the stoichiometric quantity of curing agent having the required number of anhydride groups for each glycidyl group, it may be necessary at times to provide considerable quantities of the curing agent to the extent that the amount of the curing agent present may exceed the amount to the resin on a weight basis. In any case, the curing agent will always be present in such sizeable quantities that it is a major ingredient. Therefore, if too much or too little curing agent is present the final product will have excesses of anhydride or glycidyl groups, respectively, resulting in something less than optimum curings. The final product will then be considerably less substantially not in excess of 450° F.

The adducts of this invention also can be polymerized in the presence of peroxide polymerization catalysts such as benzoyl peroxide, t-butyl peroxide, and the like, by conventional techniques such as bulk polymerization, emulsion polymerization, and the like.

I claim as my invention:

1. The reaction product of maleic anhydride with a compound having the formula

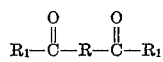

wherein R is a divalent acyclic carbon chain having from 14 to 26 carbon atoms, said divalent chain having two ethylenic linkages which are at least four carbon atoms removed from the carbonyl groups and $R_1$ is a functional group selected from the group consisting of lower alkyl, —OH, —$NH_2$, and $OR_2$, and mixtures thereof, $R_2$ being lower alkyl, said product being prepared in the liquid phase in the presence of an inert solvent at temperatures ranging from 100° C. to about 250° C., the anhydride being present in a ratio of about 1 to about 3 moles per mole of the carbonyl compound.

2. The product of claim 1 in which $R_1$ is —OH.

3. The product of claim 1 in which $R_1$ is —OH and R is —$(CH_2)_6$—CH=$CHCH_2CH_2$CH=CH$(CH_2)_6$—.

4. The product of claim 1 in which $R_1$ is —OH and R is

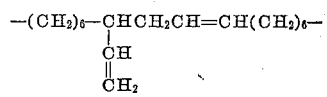

5. The product of claim 1 in which $R_1$ is $-OR_2$.
6. The product of claim 1 in which $R_1$ is $-OCH_3$ and R is $-(CH_2)_6-CH=CHCH_2CH_2CH=CH(CH_2)_6-$.
7. The product of claim 1 in which $R_1$ is $-OCH_3$ and R is

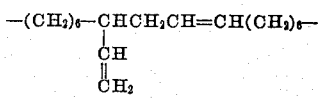

8. The product of claim 1 in which $R_1$ is $-NH_2$.
9. The product of claim 1 in which $R_1$ is $-NH_2$ and R is $-(CH_2)_6-CH=CHCH_2CH_2CH=CH(CH_2)_6-$.

References Cited in the file of this patent

UNITED STATES PATENTS

| | | |
|---|---|---|
| 2,188,882 | Clocker | Jan. 30, 1940 |
| 2,440,985 | Sutherland | May 4, 1948 |
| 2,496,358 | Ross | Feb. 7, 1950 |
| 2,582,235 | Cowan | Jan. 15, 1952 |
| 2,671,810 | Coffman | Mar. 9, 1954 |
| 2,745,844 | Dazzi | May 15, 1956 |

OTHER REFERENCES

Flett: Maleic Anhydride Derivatives (1952), pages 192–193.